US008887668B2

(12) United States Patent
Lee et al.

(10) Patent No.: US 8,887,668 B2
(45) Date of Patent: Nov. 18, 2014

(54) APPARATUS FOR CONTROLLING ALGAL BLOOMS AND KILLING PATHOGENS IN FISH TANK

(71) Applicants: Republic of Korea (National Fisheries Research and Development Institute), Busan (KR); Enbion, Busan (KR)

(72) Inventors: Kyoung Hoon Lee, Busan (KR); Seong Wook Park, Busan (KR); Seong Hun Kim, Busan (KR); Kyu Sup Jang, Busan (KR)

(73) Assignee: Republic of Korea (National Fisheries Research and Development Institute), Busan (KR)

( * ) Notice: Subject to any disclaimer, the term of this patent is extended or adjusted under 35 U.S.C. 154(b) by 0 days.

(21) Appl. No.: 13/671,870

(22) Filed: Nov. 8, 2012

(65) Prior Publication Data

US 2013/0284108 A1    Oct. 31, 2013

(30) Foreign Application Priority Data

Apr. 25, 2012  (KR) .................. 10-2012-0043045

(51) Int. Cl.
*A01K 63/04*    (2006.01)
*A01K 63/00*    (2006.01)

(52) U.S. Cl.
CPC ............... *A01K 63/04* (2013.01); *A01K 63/042* (2013.01); *A01K 63/045* (2013.01); *A01K 63/006* (2013.01)
USPC ........................................................ 119/264

(58) Field of Classification Search
CPC ......... A01K 63/00; A01K 63/006; A01K 63/04
USPC .......... 119/264, 259, 220; 205/746, 747, 748, 205/751, 758, 759, 701; 43/17.1, 112
See application file for complete search history.

(56) References Cited

U.S. PATENT DOCUMENTS

| 5,346,598 A | * | 9/1994 | Riffe et al. .................. 422/6 |
| 5,543,034 A | | 8/1996 | Hilbertz et al. .............. 205/688 |
| 6,315,886 B1 | * | 11/2001 | Zappi et al. .................. 205/701 |

(Continued)

FOREIGN PATENT DOCUMENTS

| JP | H06-233983 | 8/1994 | ............... C02F 1/46 |
| JP | 1999-019648 | 1/1999 | |

(Continued)

OTHER PUBLICATIONS

Office Action issued on Jul. 6, 2012, for Korean Patent Applicaton No. KR 10-2012-0043045, and a concise English explanation on the rejections in the Office Action.

(Continued)

*Primary Examiner* — Isam Alsomiri
*Assistant Examiner* — Ebony Evans
(74) *Attorney, Agent, or Firm* — Harness, Dickey & Pierce, P.L.C.

(57) ABSTRACT

Provided are a killing apparatus for use in a fish tank. The killing apparatus includes a first conductive mesh, a second conductive mesh, and a spacer which is disposed between the first conductive mesh and the second conductive mesh and insulates the first conductive mesh and the second conductive mesh. Accordingly, in the fish tank, algal blooms are prevented and reduced, fish disease is prevented, and the growth of water plants is expedited.

5 Claims, 10 Drawing Sheets

(56) References Cited

U.S. PATENT DOCUMENTS

| | | | |
|---|---|---|---|
| 8,062,485 B2 * | 11/2011 | Ogawa et al. | 204/269 |
| 8,337,690 B2 * | 12/2012 | Field | 205/687 |
| 2003/0226766 A1 | 12/2003 | Orlebeke | 205/688 |
| 2004/0118701 A1 | 6/2004 | Senkiw | 205/633 |

FOREIGN PATENT DOCUMENTS

| | | | | |
|---|---|---|---|---|
| JP | H11-019648 | 1/1999 | | C02F 1/46 |
| JP | 2001-178307 | 7/2001 | | |
| JP | 2004-350675 | 12/2004 | | A01K 63/04 |
| JP | 2008-237168 | 10/2008 | | A01K 63/04 |
| KR | 10-2011-0024720 | 3/2011 | | A01K 63/04 |

OTHER PUBLICATIONS

European Search Report (ESR) dated Apr. 15, 2013, issued in European Application No. 12191234.9.

Office Action dated Mar. 25, 2014 issued in Japanese Patent Application No. JP 2012-262649.

Office Action dated Jul. 15, 2014 issued in Chinese Patent Application No. CN 2012-10540544.8.

* cited by examiner

|  | Comparison Group | Embodiment of Invention |
|---|---|---|
| Initial stage | 100% | 100% |
| 2 days | 54% | 6% |
| 4 days | 49% | 3% |
| 7 days | 30% | 3% |
| 14 days | 39% | 2% |
| 22 days | 29% | 2% |
| 30 days | 29% | 0% |

Pathogens
1. Staphylococcus aureus
2. Aeromonas hydrophila

APPARATUS FOR CONTROLLING ALGAL BLOOMS AND KILLING PATHOGENS IN FISH TANK

CROSS-REFERENCE TO RELATED PATENT APPLICATION

This application claims priority from Korean Patent Application No. 10-2012-0043045, filed on Apr. 25, 2012, in the Korean Intellectual Property Office, the disclosure of which is incorporated herein by reference in its entirety.

BACKGROUND

1. Field

Apparatuses and methods consistent with the exemplary embodiments relate to an apparatus for controlling algal blooms and killing pathogens in a fish tank.

2. Description of the Related Art

Current fish tanks are developing in the direction of realizing a natural ecosystem as it is, in addition to the simple function of keeping fishes. For example, the fish tank is decorated with water plants of various forms and types along with rocks like a real natural ecosystem, and light, carbon dioxide, nitrogen, and/or phosphorus are supplied to the fish tank in order to grow the water plants stably.

However, algal blooms frequently occur in the fish tank due to nutrient enrichment and the removal of such algal blooms may cause inconvenience to fish tank lovers.

SUMMARY

One or more aspects of the exemplary embodiments provide a killing apparatus for preventing and reducing algal blooms, preventing fish disease, and expediting the growth of water plants in a fish tank.

According to an aspect of an exemplary embodiment, there is provided a killing apparatus for use in a fish tank, the killing apparatus including: a first conductive mesh, a second conductive mesh, and a spacer which is disposed between the first conductive mesh and the second conductive mesh and insulates the first conductive mesh and the second conductive mesh.

The first conductive mesh and the second conductive mesh may be made of titanium and may have surfaces coated with platinum group metals.

The spacer may include: a ring which forms a looped curve, and a stick which connects one portion of the looped curve of the ring to another portion of the looped curve of the ring.

The killing apparatus may further include: a first case which supports the first conductive mesh, and a second case which supports the second conductive mesh, and the first case, the first conductive mesh, the spacer, the second conductive mesh, and the second case may be connected to one another in sequence.

The killing apparatus may further include a connection portion which has an annular shape and includes a first region and a second region along a circumferential direction. The first region may have a height lower than that of the second region and a guide line may be formed on an outer edge of the connection portion to divide the connection portion into an upper portion and a lower portion. The first case may include a first body having an annular shape, a first support disposed in an inner edge of the first body to support the first conductive mesh, and a first groove formed on the first body along a circumferential direction, and the second case may include a second body having an annular shape, a second support disposed in an inner edge of the second body to support the second conductive mesh, and a second groove formed on the second body along a circumferential direction. The upper portion of the connection portion may be inserted into the first groove and the lower portion of the connection portion may be inserted into the second groove.

Protrusions may be formed on the first conductive mesh and the second conductive mesh, respectively, and the second case may further include a first injection region on which the protrusion of the first conductive mesh is placed and a second injection region on which the protrusion of the second conductive mesh is placed. A waterproof solution may be injected into the first injection region and the second injection region.

The killing apparatus may further include a pair of sucking disks to be attached to the fish tank, and the pair of sucking disks may be connected to the first case or the second case through supports.

According to one or more exemplary embodiments, in the fish tank, algal blooms can be prevented and reduced, fish disease can be prevented, and the growth of water plants can be expedited.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and other features and advantages will become more apparent by describing in detail exemplary embodiments with reference to the attached drawings in which:

FIGS. 12A and 12B are views to explain an effect of the killing apparatus according to an exemplary embodiment, in which FIG. 12A is a photo showing water plants in case of the killing apparatus according to the embodiment being not applied and FIG. 12B is a photo showing water plants in case of the killing apparatus according to the embodiment being applied.

FIGS. 13A and 13B are views to explain an effect of the killing apparatus according to the exemplary embodiment of preventing and controlling algal blooms, in which FIG. 13A is a photo of a fish tank in case of the killing apparatus according to the embodiment being not applied and FIG. 13B is a photo of a fish tank in case of the killing apparatus according to the embodiment being applied.

FIGS. 14A and 14B are views to explain an effect of the killing apparatus according to the exemplary embodiment, in which FIG. 14A is a graph showing the result of an experiment which is conducted with the killing apparatus according to the embodiment and without the killing apparatus and FIG. 14B is a view illustrating the result of the experiment quantitatively.

DETAILED DESCRIPTION OF EXEMPLARY EMBODIMENTS

Exemplary embodiments will now be described more fully with reference to the accompanying drawings to clarify aspects, features and advantages of the inventive concept. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art. It will be understood that when an element, layer or region is referred to as being "on" another element, layer or region, the element, layer or region can be directly on another element, layer or region or intervening elements, layers or regions.

The terms used herein are for the purpose of describing particular exemplary embodiments only and are not intended to be limiting. As used herein, the singular forms "a", "an" and "the" are intended to include the plural forms as well, unless the context clearly indicates otherwise. It will be further understood that the terms "comprises" and/or "comprising," when used in this specification, do not preclude the presence or addition of one or more other components.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the inventive concept.

Figure 1:
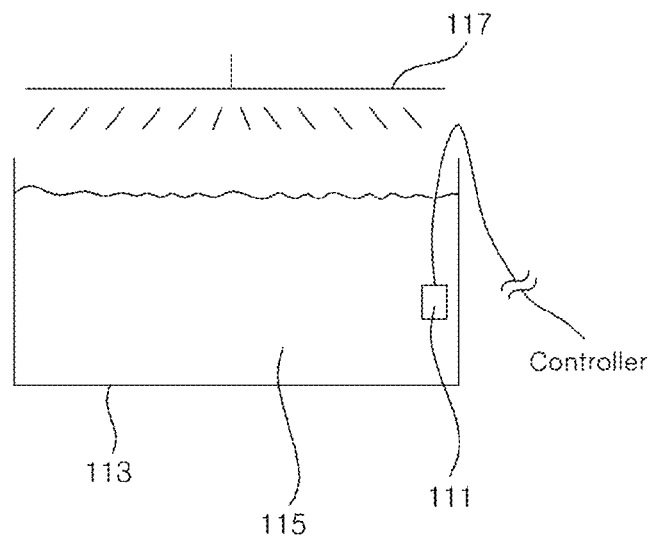
FIG. 1 is a view illustrating a fish tank which uses a killing apparatus according to an exemplary embodiment.

FIG. 1 is a view illustrating a fish tank which uses an apparatus for controlling algal blooms and killing pathogens in the fish tank (hereinafter, referred to as a killing apparatus) according to an exemplary embodiment.

Referring to FIG. 1, a fish tank 113 which uses a killing apparatus according to an exemplary embodiment contains water 115 and may include a killing apparatus 111 and a lightening apparatus 117.

According to an exemplary embodiment, the killing apparatus 111 may prevent or reduce algal blooms in the fish tank and also may prevent fish disease.

The killing apparatus 111 may be on-off controlled and may be supplied with power by a controller. The controller turns on or off the killing apparatus 111 according to a predetermined period and supplies power to the killing apparatus 111.

According to an exemplary embodiment, the controller may apply a positive (+) voltage and a negative (−) voltage alternately, when supplying power to the killing apparatus 111.

The killing apparatus 111 may perform a sterilizing operation by doing following two actions.

First, as a direct action, the killing apparatus 111 destroys cell membranes of a microscopic organism such as germ by means of an electrical potential difference between the interior and the exterior of their cell membranes, by applying voltage to the microscopic organism.

Second, as an indirect action, the killing apparatus 111 generates radical and sterilizes the fish tank by means of the radical.

In addition, the killing apparatus 111 may assist the growth of water plants in the fish tank. That is, positive ions such as $Ca^{+2}$, $K^+$, $Mg^{+2}$, $Fe^{+2}$, $Zn^{+2}$, and/or $Na^+$ are activated in water by the killing apparatus 111, thereby contributing to the growth of the water plants.

The lightening apparatus 117 provides light to the fish tank under control of the controller.

Figure 2:
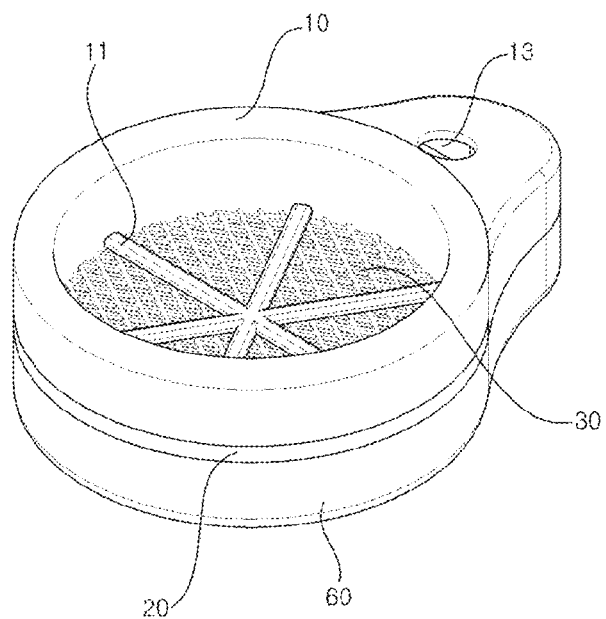
FIG. 2 is a perspective view illustrating a killing apparatus according to an exemplary embodiment.
Figure 3:
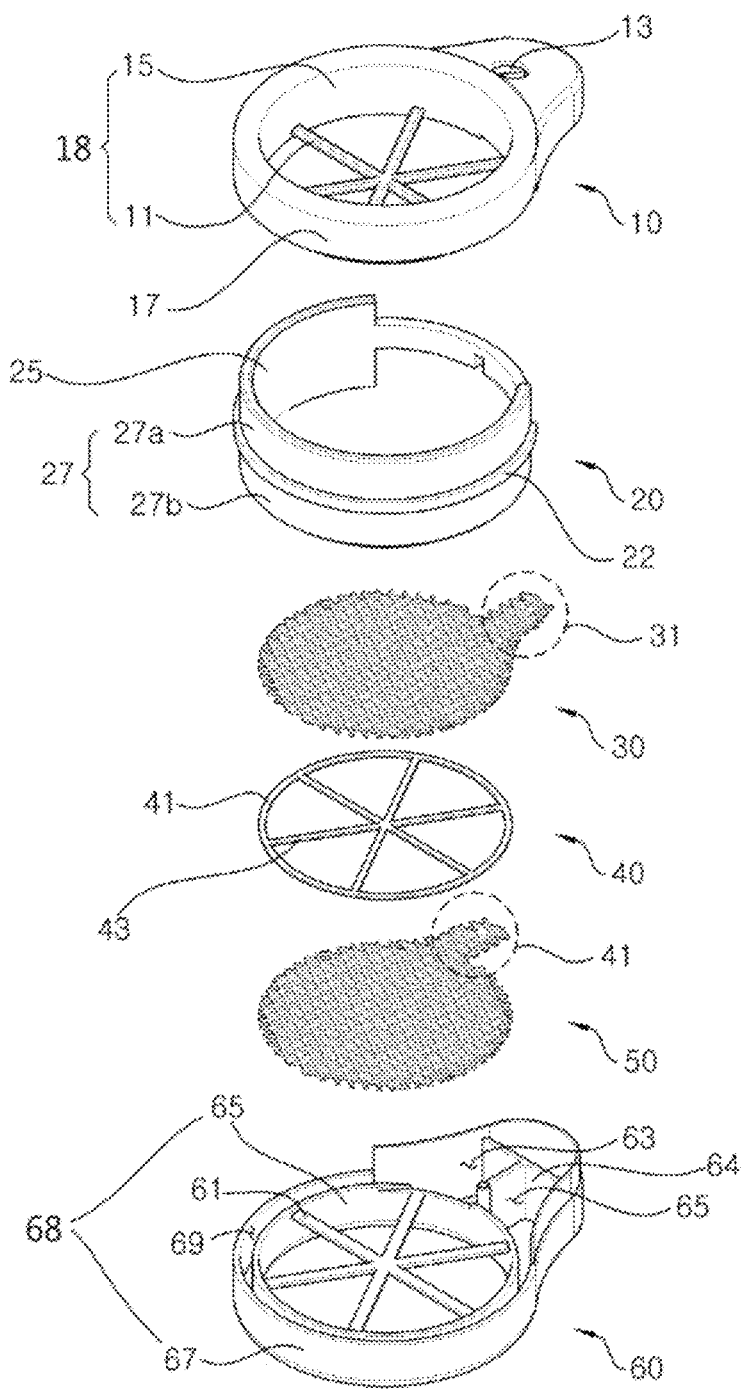
FIG. 3 is an exploded perspective view illustrating the killing apparatus according to the exemplary embodiment.
Figure 4:
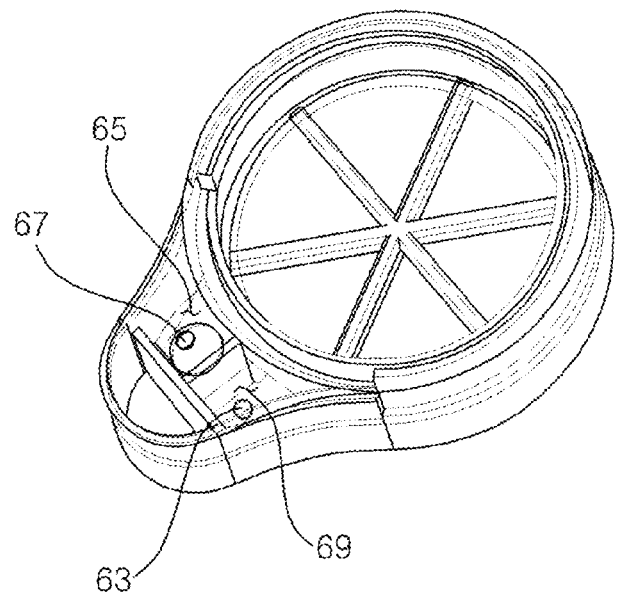
FIG. 4 is a view to explain a lower case of the killing apparatus according to the exemplary embodiment.
Figure 5:
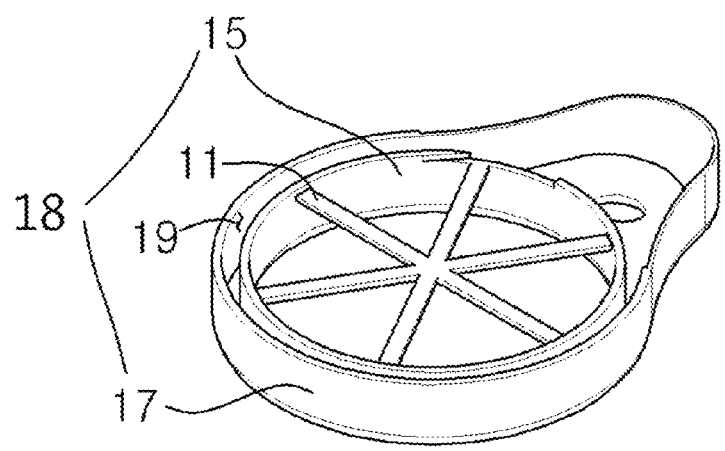
FIG. 5 is a view to explain an upper case of the killing apparatus according to the exemplary embodiment.
Figure 6:
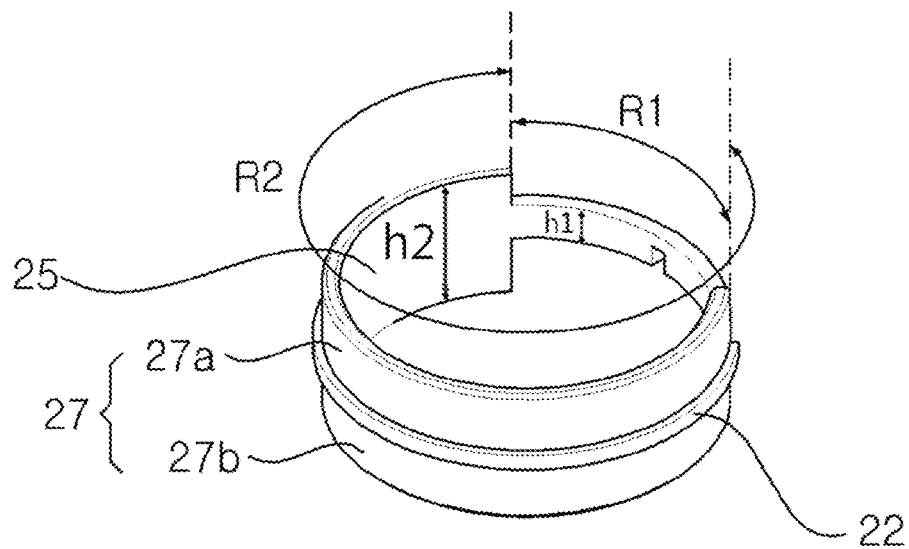
FIG. 6 is a view to explain a connection portion of the killing apparatus according to the exemplary embodiment.

FIG. 2 is a perspective view illustrating a killing apparatus according to an exemplary embodiment, FIG. 3 is an exploded perspective view illustrating the killing apparatus according to the exemplary embodiment, FIG. 4 is a view to explain a lower case of the killing apparatus according to the exemplary embodiment, FIG. 5 is a view to explain an upper case of the killing apparatus according to the exemplary embodiment, and FIG. 6 is a view to explain a connection portion of the killing apparatus according to the exemplary embodiment. Hereinafter, the killing apparatus according to the exemplary embodiment will be explained with reference to these drawings.

The killing apparatus 111 includes an upper case 10, a connection portion 20, a first conductive mesh 30, a spacer 40, a second conductive mesh 50, and a lower case 60.

According to an exemplary embodiment, the upper case 10, the connection portion 20, the first conductive mesh 30, the spacer 40, the second conductive mesh 50, and the lower case 60 are connected to one another in sequence.

The upper case 10 may include a first body 18 and a first support 11. The first body 18 has an annular shape and includes an inner edge 15 and an outer edge 17. The first support 11 is disposed in the inner edge 15 of the first body 18, crossing from one position of the inner edge 15 to another position of the inner edge 15, thereby supporting the first conductive mesh 30.

In the present exemplary embodiment, the first support 11 includes a plurality of sticks arranged in the inner edge 15 in a radial pattern.

The upper case 10 may further include a hole 13. The hole 13 may be necessary for facilitating manufacturing of the killing apparatus 111. Referring to FIG. 5, it can be seen that the upper case 10 may further include a groove 19. The groove 19 is connected with the connection portion 20.

The connection portion 20 has an annular shape and includes an inner edge 25 and an outer edge 27, and also, is divided into a first region R1 and a second region R2 along a circumferential direction. A width of the first region R1 is different from a width of the second region R2, and the height (h1) of the first region R1 is smaller than the height (h2) width of the second region R2.

The first region R1 is adjacent to a first injection region 63 and a second injection region 65, which will be described below.

A guide line 22 is additionally formed on the outer edge 27 of the connection portion 20 to divide the connection portion 20 into an upper portion 27a and a lower portion 27b. The upper portion 27a of the connection portion 20 is inserted into the groove 19 of the upper case 10 described above, and the lower portion 27b of the connection portion 20 is inserted into a groove 69 of the lower case 60, which will be described below.

The first conductive mesh 30 and the second conductive mesh 50 may be made of titanium and may have surfaces coated with platinum group metals. The first conductive mesh 30 and the second conductive mesh 50 include protrusions 31 and 41, respectively, and the protrusions 31 and 41 are placed on the second injection region 65 and the first injection region 63, respectively.

According to an exemplary embodiment, a size of mesh holes of the first conductive mesh 30 is a different from that of mesh holes of the second conductive mesh 50. According to a direction in which the killing apparatus is disposed, the mesh hole size of the first conductive mesh 30 may be different from that of the second conductive mesh 50. For example, a conductive mesh that is disposed farther from the ground than the other conductive mesh may have a greater mesh hole. That is, if the killing apparatus has the first conductive mesh 30 disposed farther from the ground than the second conductive mesh 50, the mesh hole of the first conductive mesh 30 is greater than that of the second conductive mesh 50. This is to allow air bubbles generated by the killing apparatus to pass through the mesh 30 more easily.

The controller applies voltages to the first conductive mesh 30 and the second conductive mesh 50 so that polarities of the voltages of the first conductive mesh 30 and the second conductive mesh 50 are changed alternately.

The spacer 40 is disposed between the first conductive mesh 30 and the second conductive mesh 50 and insulates the first conductive mesh 30 and the second conductive mesh 50.

The spacer 40 has a predetermined thickness so that an electric current does not flow between the first conductive mesh 30 and the second conductive mesh 50. The spacer 40 may include a ring 41 and a stick 43 to support the first conductive mesh 30 and the second conductive mesh 50. The stick 43 may be a plurality of sticks 43 and may be formed to connect a part of a looped curve of the ring 41 and another part of the looped curve of the ring 41. The spacer 40 is provided to maintain a gap between the first conductive mesh 30 and the second conductive mesh 50 uniformly, as well as supporting the first conductive mesh 30 and the second conductive mesh 50. Therefore, a gap between centers of the first conductive mesh 30 and the second conductive mesh 50 can be uniformly maintained.

The lower case 60 may include a second body 68 and a second support 61. The second body 68 has an annular shape and includes an inner edge 65 and an outer edge 67. The second support 61 is disposed in the inner edge 65 of the second body, but crosses from one position of the inner edge 65 to another position of the inner edge 65, thereby supporting the second conductive mesh 50.

In the present exemplary embodiment, the second support 61 may include a plurality of sticks arranged in the inner edge 65 in a radial pattern.

The lower case 60 may further include the first injection region 63 and the second injection region 65. The first injection region 63 and the second injection region 65 are separated from each other by a partition 64, and holes are placed on the first injection region 63 and the second injection region 65.

The protrusion 41 of the second conductive mesh 50, which will be described below, is placed on the first injection region 63, and the protrusion 31 of the first conductive mesh 30, which will be described below, is placed on the second injection region 65. In this state, the protrusion 31 of the first conductive mesh 30 is connected to one of a positive (+) electric wire and a negative (−) electric wire, and the protrusion 41 of the second conductive mesh 50 is connected to the other electric wire.

After that, a waterproof solution is injected into the first injection region 63 and the second injection region 65, and ionization and corrosion of the electric wire can be prevented. The waterproof solution may be, but not limited to, a silicon-based solution.

For the convenience of explanation, the first body and the second body are collectively called 'body', and the first injection region, the second injection region, and the partition are collectively called 'injection portion'.

Figure 7:
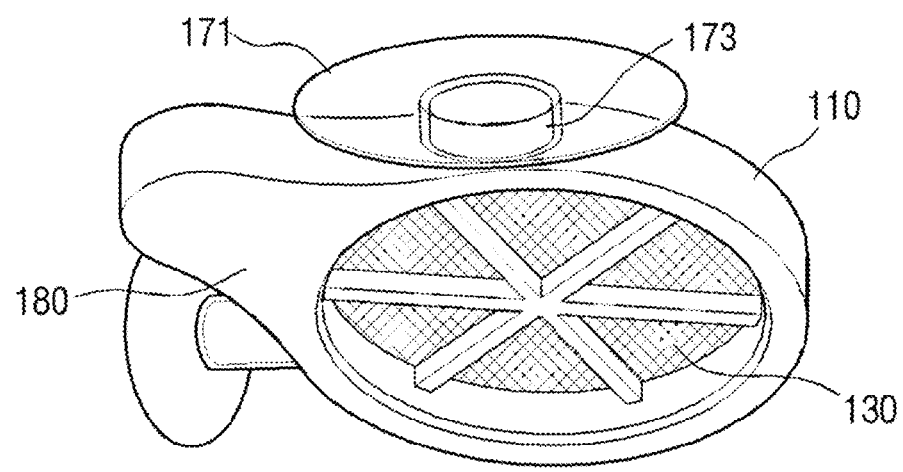
FIGS. 7 and 8 are views to explain a killing apparatus according to another exemplary embodiment.
Figure 8:
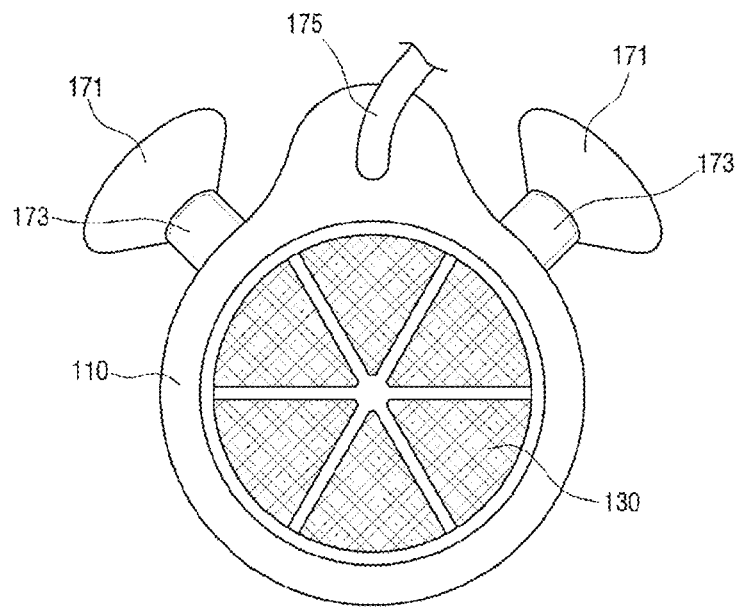

FIGS. 7 and 8 are views illustrating a killing apparatus according to another exemplary embodiment.

Referring to FIGS. 7 and 8, the killing apparatus according to another exemplary embodiment includes a pair of sucking disks 171 and supports 173 to support the sucking disks 171. The exemplary embodiment of FIG. 7 differs from the exemplary embodiment of FIG. 2 in that the killing apparatus further includes the pair of sucking disks 171 and the supports 173. The other elements in the exemplary embodiment of FIG. 7 are the same as or similar to the elements using similar numbers in the exemplary embodiment of FIG. 2 in their functions, and thus a detailed description is omitted.

In the exemplary embodiment of FIG. 7, the pair of sucking disks 171 are provided so that the killing apparatus can be stably fixed at a corner of the fish tank. In particular, the sucking disks 171 are attached to a corner of a rectangular fish tank, so that the killing apparatus can be stably fixed.

The supports 173 connect the sucking disks 171 and the killing apparatus each other and may be disposed on any one of an upper case 110 and a lower case.

Figure 9:
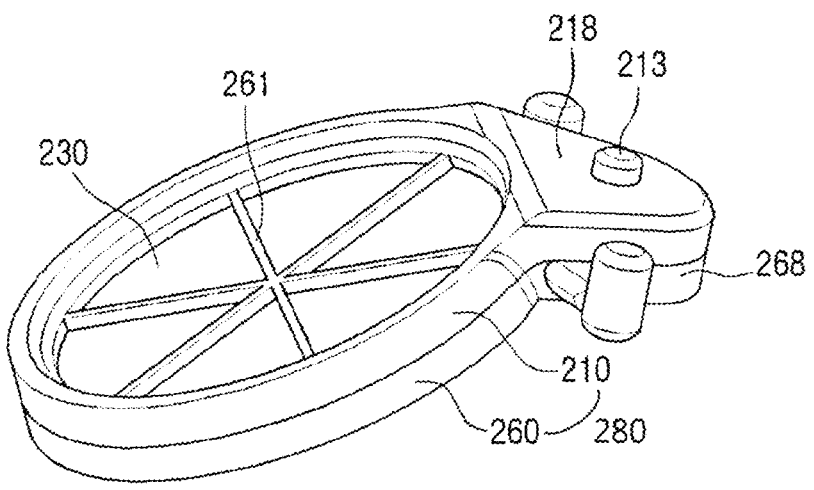
FIGS. 9 and 10 are views to explain a killing apparatus according to still another exemplary embodiment.
Figure 10:
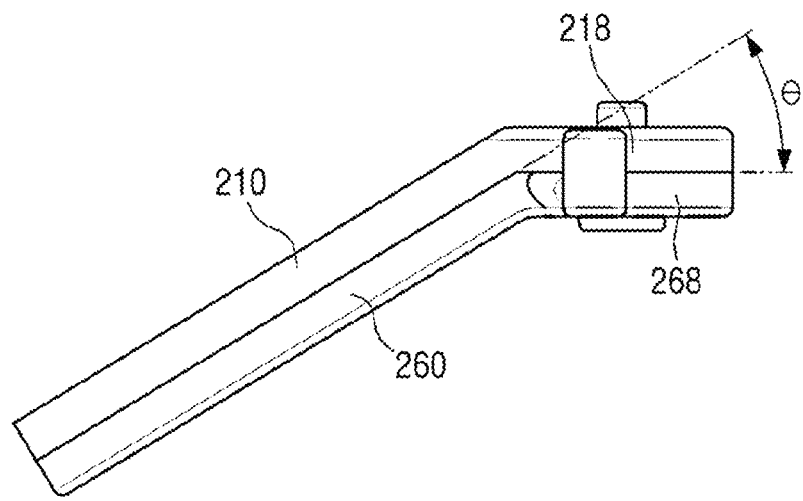

FIGS. 9 and 10 are views to explain a killing apparatus according to still another exemplary embodiment.

Referring to FIGS. 9 and 10, the exemplary embodiment of FIG. 9 differs from the exemplary embodiment of FIG. 2 in that a body 280 on which a conductive mesh 230 (not illustrated by diagonal lines unlike in the other embodiments) is disposed forms a predetermined angle (θ) with injection portions 218 and 268. The other elements of the exemplary embodiment of FIG. 9 are the same as or similar to the elements using similar reference numerals in the exemplary embodiment of FIG. 2 in their functions, and thus a detailed description is omitted.

Figure 11:
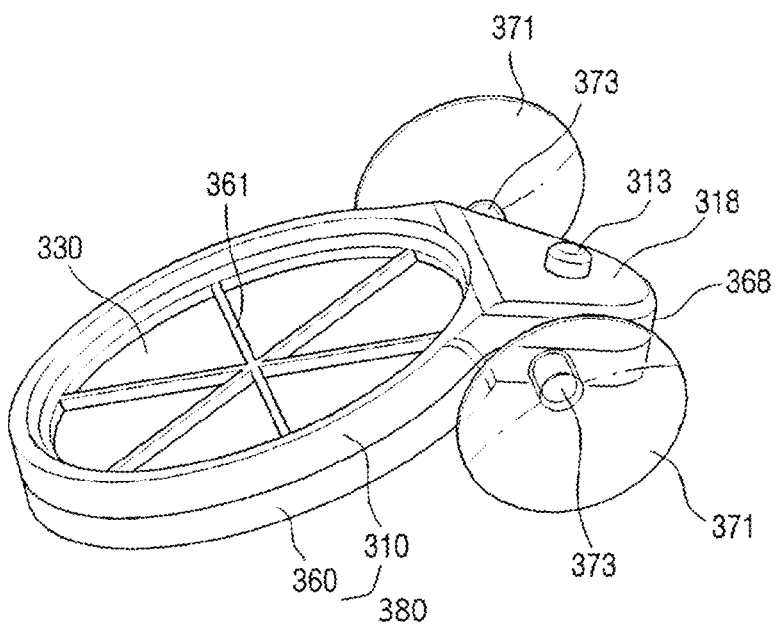
FIG. 11 is a view to explain a killing apparatus according to still another exemplary embodiment.

The injection portion recited herein refers to a portion that includes injection regions and a partition as described above in the exemplary embodiment of FIG. 2, and is used as the same meaning in an exemplary embodiment of FIG. 11.

FIG. 11 is a view to explain a killing apparatus according to still another exemplary embodiment.

Referring to FIG. 11, the exemplary embodiment of FIG. 11 differs from the exemplary embodiment of FIG. 2 in that a body 380 on which a conductive mesh 330 (not illustrated by diagonal lines unlike in the other embodiments) is disposed forms a predetermined angle (θ) with injection portions 318 and 368, and that a pair of sucking disks 371 and supports 373 are further included.

The other elements of the exemplary embodiment of FIG. 11 are the same as or similar to the elements using similar reference numerals in the exemplary embodiment of FIG. 2 in their functions, and thus a detailed description is omitted.

In the exemplary embodiment of FIG. 11, the pair of sucking disks 371 are provided so that the killing apparatus can be stably fixed at a corner of the fish tank. In particular, the pair of sucking disks 371 are attached to a corner of a rectangular fish tank, so that the killing apparatus can be stably fixed. If the exemplary embodiment of FIG. 11 is applied to a rectangular fish tank, the pair of sucking disks 371 may be placed perpendicular to each other.

Figure 12A:
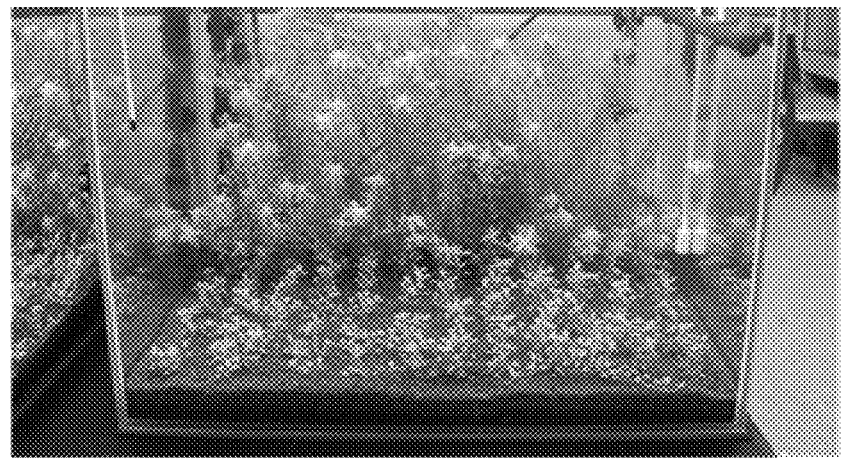
Figure 12B:
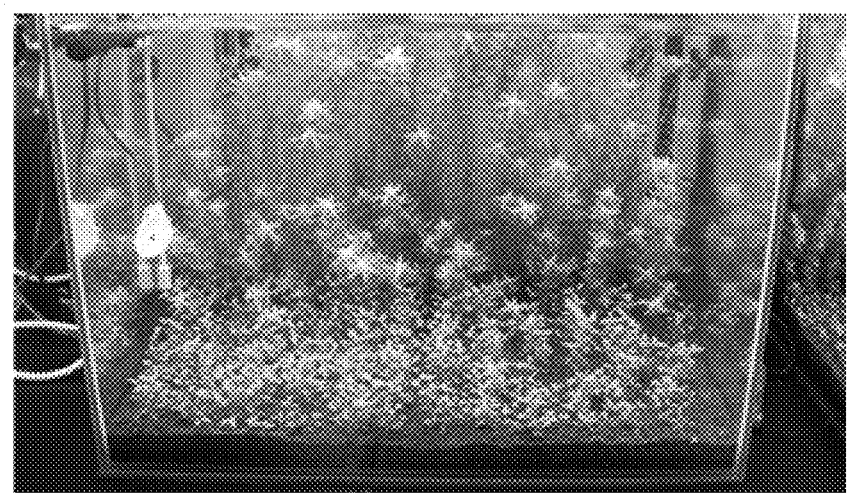

FIGS. 12A and 12B are views to explain an effect of the killing apparatus according to an exemplary embodiment of expediting the growth of water plants.

FIGS. 12A is a photo showing water plants if the killing apparatus according to the exemplary embodiment is not applied, and FIG. 12B is a photo showing water plants if the killing apparatus according to the exemplary embodiment is applied. The photos are the results of photographing after about 31 days since the fish tank has been set.

It can be seen from the drawings that the water plants grow better in the fish tank with the killing apparatus than in the fish thank without the killing apparatus.

Figure 13A:
Figure 13B:

FIGS. 13A and 13B are views to explain an effect of the killing apparatus according to the exemplary embodiment of preventing and controlling algal blooms.

FIGS. 13A is a photo of a fish tank if the killing apparatus according to the exemplary embodiment is not applied, and FIG. 13B is a photo of a fish tank if the killing apparatus according to the exemplary embodiment is applied. The photos are the results of photographing after about 21 days since the fish tank has been set.

It can be seen from the drawings that algal blooms are noticeably prevented and controlled if the killing apparatus according to the exemplary embodiment is installed in the fish thank.

Figure 14A:
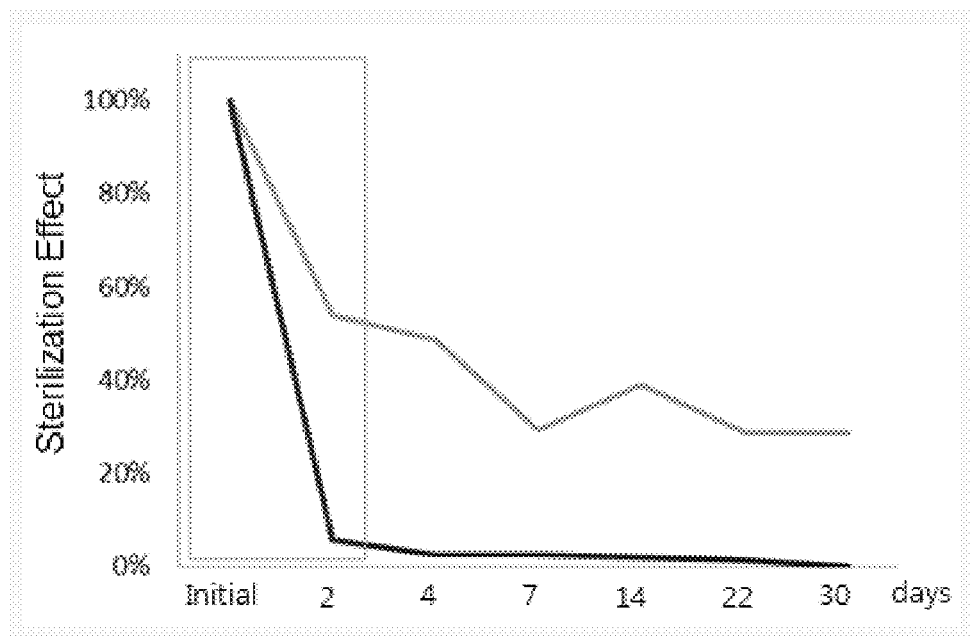
Figure 14B:
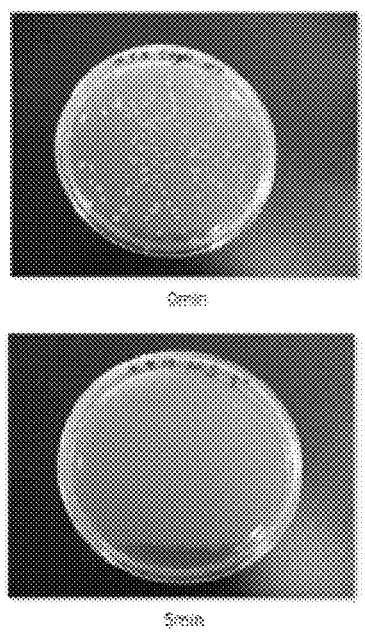

FIGS. 14A and 14B are views to explain an effect of the killing apparatus according to the exemplary embodiment of controlling fish disease.

FIG. 14A is a graph showing the result of an experiment which is conducted by injecting *Aeromonas hydrophila* and *Staphylococcus aureus* into a fish tank with the killing apparatus according to the exemplary embodiment and a fish tank without the killing apparatus, and FIG. 14B is a view illustrating the result of the experiment quantitatively.

It can be seen that the fish tank with the killing apparatus according to the exemplary embodiment achieves sterilization efficiency of 100% after 30 days elapse, whereas the comparison group achieve sterilization efficiency of about 29% and there is no big change.

While exemplary embodiments have been particularly shown and described above, it will be understood by those of ordinary skill in the art that various changes in form and details may be made therein without departing from the spirit and scope of the present invention as defined by the following claims.

What is claimed is:

1. An apparatus for use in a fish tank, the apparatus comprising:
   a first conductive mesh;
   a second conductive mesh;
   a spacer which is disposed between the first conductive mesh and the second conductive mesh and insulates the first conductive mesh and the second conductive mesh;
   a first case which supports the first conductive mesh;
   a second case which supports the second conductive mesh; and
   a connection portion which has an annular shape and comprises a first region and a second region along a circumferential direction,
   wherein the first case, the first conductive mesh, the spacer, the second conductive mesh, and the second case are connected to one another in sequence,
   wherein the first region has a height lower than that of the second region and a guide line is formed on an outer edge of the connection portion to divide the connection portion into an upper portion and a lower portion,
   wherein the first case comprises a first body having an annular shape, a first support disposed in an inner edge of the first body to support the first conductive mesh, and a first groove formed on the first body along a circumferential direction,
   wherein the second case comprises a second body having an annular shape, a second support disposed in an inner edge of the second body to support the second conductive mesh, and a second groove formed on the second body along a circumferential direction, and
   wherein the upper portion of the connection portion is inserted into the first groove and the lower portion of the connection portion is inserted into the second groove.

2. The apparatus of claim 1, wherein the first conductive mesh and the second conductive mesh are made of titanium and have surfaces coated with platinum group metals.

3. The apparatus of claim 1, wherein the spacer comprises:
   a ring which forms a looped curve; and
   a stick which connects one portion of the looped curve of the ring to another portion of the looped curve of the ring.

4. The apparatus of claim 1, wherein protrusions are formed on the first conductive mesh and the second conductive mesh, respectively,
   wherein the second case further comprises a first injection region on which the protrusion of the first conductive mesh is placed and a second injection region on which the protrusion of the second conductive mesh is placed,
   wherein a waterproof solution is injected into the first injection region and the second injection region.

5. The apparatus of claim 1, further comprising a pair of sucking disks to be attached to the fish tank,
   wherein the pair of sucking disks are connected to the first case or the second case through supports.

* * * * *